(12) United States Patent  
Westenbroek

(10) Patent No.: US 8,885,851 B2  
(45) Date of Patent: Nov. 11, 2014

(54) PORTABLE DEVICE THAT PERFORMS AN ACTION IN RESPONSE TO MAGNITUDE OF FORCE, METHOD OF OPERATING THE PORTABLE DEVICE, AND COMPUTER PROGRAM

(75) Inventor: Marcel Westenbroek, Emmen (NL)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1594 days.

(21) Appl. No.: 12/026,003

(22) Filed: Feb. 5, 2008

(65) Prior Publication Data

US 2009/0196436 A1 Aug. 6, 2009

(51) Int. Cl.
| | |
|---|---|
| *H03G 3/00* | (2006.01) |
| *H04M 1/725* | (2006.01) |
| *G06F 3/01* | (2006.01) |
| *H04M 1/60* | (2006.01) |
| *G06F 3/041* | (2006.01) |
| *H04M 1/27* | (2006.01) |

(52) U.S. Cl.
CPC ............ *H04M 1/7258* (2013.01); *H04M 1/271* (2013.01); *G06F 3/016* (2013.01); *H04M 1/6066* (2013.01); *G06F 3/0414* (2013.01); *H04M 2250/22* (2013.01)
USPC .......................................... 381/104; 381/162

(58) Field of Classification Search
CPC . H04M 1/6066; H04M 1/05; H04M 2250/02; H04M 19/04; H04M 1/271; H04M 1/6041; H04M 1/7253; H04M 2250/74; H04M 1/0202; H04M 2250/22; H04M 2250/12; H03M 11/10; H04N 21/441; H04Q 2213/13274; H04Q 2213/13387; H04R 1/00; H04R 1/1041; H04R 2201/107; G06F 3/03547; G06F 2203/013; G06F 2203/014
USPC ................ 345/173; 381/104, 162; 178/18.01; 704/275

See application file for complete search history.

(56) References Cited

U.S. PATENT DOCUMENTS

| | | | |
|---|---|---|---|
| 5,184,120 A | 2/1993 | Schultz | |
| 5,675,329 A | 10/1997 | Barker et al. | |
| 5,966,093 A | 10/1999 | Chapman | |
| 2005/0130604 A1* | 6/2005 | Chipchase et al. | 455/90.3 |
| 2006/0013415 A1* | 1/2006 | Winchester | 381/110 |
| 2006/0215821 A1* | 9/2006 | Rokusek et al. | 379/88.01 |
| 2007/0172038 A1* | 7/2007 | Berranger et al. | 379/112.1 |
| 2007/0255435 A1* | 11/2007 | Cohen et al. | 700/94 |
| 2008/0105470 A1* | 5/2008 | Van De Ven et al. | 178/18.01 |

(Continued)

FOREIGN PATENT DOCUMENTS

| | | | |
|---|---|---|---|
| EP | 1 109 382 A2 | 6/2001 | |
| EP | 1 841 189 A1 | 10/2007 | |

(Continued)

*Primary Examiner* — Duy T Nguyen
(74) *Attorney, Agent, or Firm* — Renner, Otto, Boisselle & Sklar, LLP

(57) ABSTRACT

A portable device having a user input consisting of a single touch sensitive area is disclosed. The user input is arranged to output a signal responsive to force applied to the touch sensitive area. The device further has a controller arranged to discriminate one of a plurality of levels of said signal for provision of a corresponding control signal. The control signal can be used for controlling operation of the portable device. A method of operating the portable device, and a computer program for implementing the method are also disclosed.

18 Claims, 3 Drawing Sheets

(56) References Cited

U.S. PATENT DOCUMENTS

| | | | |
|---|---|---|---|
| 2008/0146290 A1* | 6/2008 | Sreeram et al. | 455/569.1 |
| 2008/0268776 A1* | 10/2008 | Amendola | 455/41.2 |
| 2008/0318672 A1* | 12/2008 | Ramaswamy et al. | 463/29 |
| 2009/0041313 A1* | 2/2009 | Brown | 382/124 |

FOREIGN PATENT DOCUMENTS

| | | | |
|---|---|---|---|
| GB | 2 381 499 A | | 10/2001 |
| JP | 2001-166865 | | 6/2001 |
| JP | 2004-023498 | | 1/2004 |
| JP | 2004-037646 | | 2/2004 |
| JP | 2005-175555 | | 6/2005 |
| JP | 2005-217695 | | 8/2005 |
| JP | 2005217695 | * | 8/2005 |
| WO | WO 02/067555 A1 | | 8/2002 |
| WO | WO 2006/013521 A2 | | 2/2006 |
| WO | WO 2006/013521 A3 | | 2/2006 |
| WO | WO 2006/087567 A2 | | 8/2006 |
| WO | WO 2006/087567 A3 | | 8/2006 |
| WO | WO 2007/141769 A2 | | 12/2007 |
| WO | WO 2007/141769 A3 | | 12/2007 |

* cited by examiner

PORTABLE DEVICE THAT PERFORMS AN ACTION IN RESPONSE TO MAGNITUDE OF FORCE, METHOD OF OPERATING THE PORTABLE DEVICE, AND COMPUTER PROGRAM

TECHNICAL FIELD

The present invention relates to a portable device, a method of operating the portable device, and a computer program for implementing the method.

BACKGROUND

For any apparatus to be handled by a user, user interface is of high importance of how the apparatus will work in practice. This particularly apply to portable devices, where there is limited space for the user interface, and at the same time, it is desirable that the user interface is easily handled also when the user is moving or performing simultaneous tasks. An approach for simplified input interfaces is use of single-button input. An example of this is provided in U.S. Pat. No. 5,966,093 A, which discloses a switch monitor which determines when first, second and third status commands are issued based upon first, second and third predetermined sequential switch output states. A microprocessor in conjunction with a memory maintains timers for the status commands. However, this approach requires some rhythm sense from the user, and may be hard to learn to use. Therefore, there is a need for a simplified user input that is easier to learn how to use.

SUMMARY

The present invention is based on the understanding that intuitive input should be based on parameters that are directly recognizable by human intuition, such as position, speed, force, or direction. The present invention is further based on the understanding that an input that is implementable on a minimal space should only require small or no movements in connection with the input action. From this, the inventor has formed an approach based on force applied to a single input area. An example of input based on degree of mechanical interaction can be found in GB 2 381 499 A, which discloses producing an input signal in relation to a degree of manual interaction, and a processing procedure is initiated if the input signal exceeds a first threshold level, and also to a second threshold level such that a first or second character on a display is presented based on the single key press. A similar discrimination of different inputs has been found to be advantageous by the inventor for controlling a small portable device, such as a headset, comprising only a single input area.

According to a first aspect of the present invention, there is provided a portable device having a user input consisting of a single touch sensitive area, wherein the user input is arranged to output a signal responsive to force applied to the touch sensitive area, and the device further having a controller arranged to discriminate one of a plurality of levels of said signal for provision of a corresponding control signal.

The control signal may be arranged to control an audio volume. The control signal corresponding to a signal level above a threshold level may be arranged such that said audio volume is increased, and the control signal corresponding to a signal level below said threshold level may be arranged such that said audio volume is decreased, when said user input is actuated. The control signal may be arranged to control handling of a call. The control signal corresponding to a signal level above a threshold level may be arranged such that said call is rejected, and the control signal corresponding to a signal level below said threshold level may be arranged such that said call is accepted, when said call is received and said user input is actuated. The control signal corresponding to a signal level below a threshold level may be arranged such that voice control is activated for initiating said call, and the control signal corresponding to a signal level above said threshold level may be arranged such that redialing of most recent telephone number is performed for initiating said call, when said headset is in a stand-by mode and said user input is actuated.

The portable device may be a headset. The headset may be arranged to communicate wirelessly via Bluetooth technology.

The user input may comprise a load cell, in mechanical connection with the touch sensitive area, forming a transducer for converting applied force of user input into said signal. The load cell may be one of a group comprising an electroactive polymer, a microelectromechanical sensor, a strain gauge, and a piezoelectric sensor.

According to a second aspect of the present invention, there is provided a method of operating a portable device having a user input consisting of a single touch sensitive area, the method comprising providing a signal responsive to force applied to the touch sensitive area;

discriminating one of a plurality of levels of said signal; and providing a control signal corresponding to the discriminated level.

The method may further comprise controlling an audio volume in response to the control signal.

The method may further comprise increasing said audio volume when the control signal corresponding to a signal level is above a threshold level; and decreasing said audio volume when the control signal corresponding to a signal level is below said threshold, when said user input is actuated.

The portable device may be a headset, wherein the method further may comprise communicating wirelessly via Bluetooth technology.

The method may further comprise handling a call based on the control signal.

The method may further comprise rejecting said call when the control signal corresponding to a signal level is above a threshold level; and accepting said call when the control signal corresponding to a signal level is below said threshold level, when said call is received and said user input is actuated.

The method may further comprise activating voice control for initiating said call when the control signal corresponding to a signal level is below a threshold level; and performing redialing of most recent telephone number for initiating said call when the control signal corresponding to a signal level is above said threshold level, when said headset is in a stand-by mode and said user input is actuated.

The touch sensitive area may comprise a load cell forming a transducer, wherein the method further may comprise converting applied force of user input into said signal by said load cell.

According to a third aspect of the present invention, there is provided a computer readable medium comprising a set of instructions that causes a processor to control providing a signal responsive to force applied to the touch sensitive area; discriminating one of a plurality of levels of said signal; and providing a control signal corresponding to the discriminated level.

The computer readable medium may further comprise a set of instructions that causes a processor to control an audio volume in response to the control signal.

The computer readable medium may comprise a set of instructions that causes a processor to control increasing said audio volume when the control signal corresponding to a signal level is above a threshold level; and decreasing said audio volume when the control signal corresponding to a signal level is below said threshold, when said user input is actuated.

The computer readable medium may comprise a set of instructions that causes a processor to control handling of a call based on the control signal.

The computer readable medium may comprise a set of instructions that causes a processor to control rejecting said call when the control signal corresponding to a signal level is above a threshold level; and accepting said call when the control signal corresponding to a signal level is below said threshold level, when said call is received and said user input is actuated.

The computer readable medium may comprise a set of instructions that causes a processor to control activating voice control for initiating said call when the control signal corresponding to a signal level is below a threshold level; and performing redialing of most recent telephone number for initiating said call when the control signal corresponding to a signal level is above said threshold level, when said headset is in a stand-by mode and said user input is actuated.

DETAILED DESCRIPTION

Figure 1:
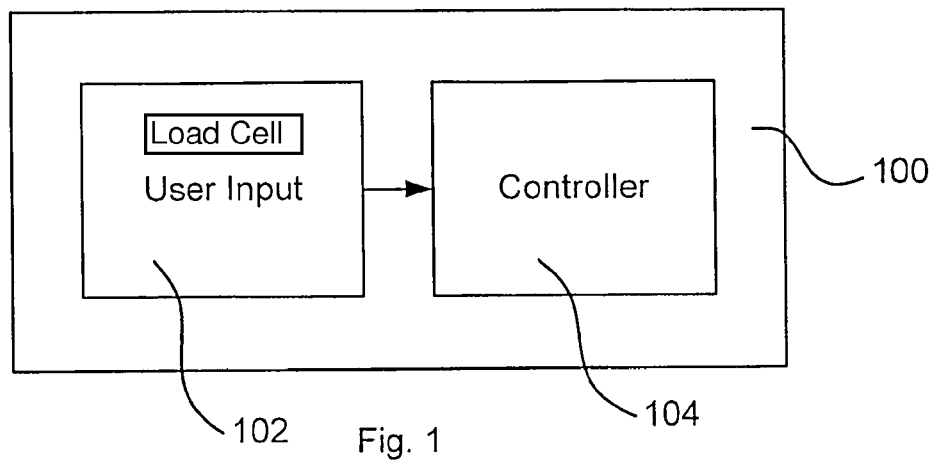
FIG. 1 is a block diagram schematically illustrating a portable device according to the present invention.

FIG. 1 is a block diagram schematically illustrating a portable device 100 according to the present invention. The portable device 100 can be a headset or other portable device where a simple and intuitive user input which do not require much space is advantageous, such as a watch, pulse meter, remote control, etc. The portable device 100 comprises a user input 102 for user control of the device 100. The user input 102, to achieve the simple and intuitive user input which do not require much space, consists of a single touch sensitive area, e.g. a button or key, which is able to provide an output signal that is responsive to the amount of force applied by the user to the touch sensitive area. The user input can, to be able to provide such a signal, comprise a load cell as a transducer which is able to convert or indicate the applied force by providing the signal.

The load cell can be implemented by using electroactive polymers, a micromechanical sensor, a strain gauge, a piezo-electric sensor, or any other sensor known within the art of sensors able to give an electrical output signal responsive to applied force. The signal can be sampled, filtered, and/or processed in any other way to facilitate processing in a controller 104 of the portable device 100.

The controller 104 processes the signal to judge the applied force, i.e. the intentions of the user actuating the user input 102. The processing of course include determining if the user input 102 is actuated or not, but also if the applied force at actuation is above or below a threshold that preferably is set such that it is clear whether the user intended a hard or a soft press on the user input 102.

Optionally, there can be more than two levels of force of the actuation to be discriminated to increase the alternatives to be input, although this may make discrimination of the user's intentions harder. Further optionally, the levels of actuation can be combined with timing of actuation, such as short or long press as is used for some user interfaces of mobile telephones, or multiple pressing, as disclosed in U.S. Pat. No. 5,966,093 A. Similar to the use of several levels of force, this will increase the alternatives to be input, but this may decrease the intuitiveness for the user.

The controller 104 thus provides a control signal based on the judgment of the signal provided by the user input 102, which control signal is likely to reflect the intention of the user. The control signal is then used to control operation of the portable device. For example, the control signal can be used to adjust an audio volume for an audio output provided by the portable device, e.g. through a speaker. Thus, the control signal corresponding e.g. to a signal level above a threshold level controls the audio volume to increase, while to a signal level below the threshold level controls the audio volume to decrease. Of course can the two alternatives be switched, if the design of the user interface so requires.

The above given example is for example suitable for a headset, which normally comprises a speaker for which the volume of audio output is desirable to be adjusted, and optionally a microphone for two-way communication, and is arranged to communicate with a main device, such as a telephone, a computer, a media player, a personal digital assistant, a navigation aid, etc. This communication can be wired, or alternatively performed wirelessly, e.g. using Bluetooth wireless technology. For telephonic use, the control signal can be applied for controlling handling of a call. For example, one state of input, as described above, can be mapped to control accepting a received call, while another state can be mapped to control rejecting the call. Alternatively, or additionally as different operation modes implied by different situations, e.g. stand-by, call reception and ongoing call, can give different alternatives, one state of input, as described above, can be mapped to control activation of voice control, while another state can be mapped to control redialing of most recent telephone number.

As indicated above, different situations can give the user different alternatives for one and the same device, where the stand-by situation can give the alternatives of activating voice control and redialing, while call reception can give the alternatives of accepting or rejecting the call, and while ongoing call can give the alternatives of adjusting the audio volume.

Figure 2:
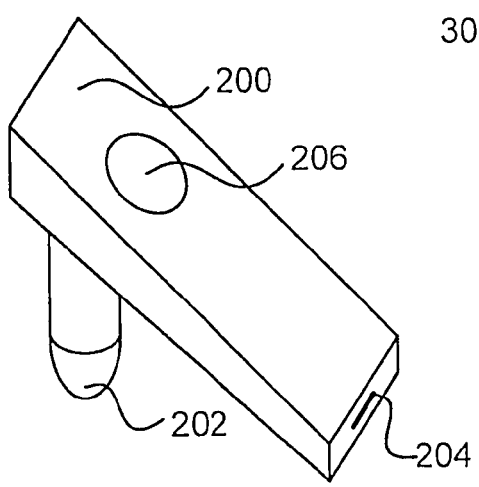
FIG. 2 illustrates a portable device according to an embodiment of the present invention.

FIG. 2 illustrates a portable device 200 according to an embodiment of the present invention, here illustrated by a wireless headset comprising an audio output 202 to be applied at the user's ear and a microphone 204 to be directed towards the user's mouth. The portable device 200 has a user input for control of the device 200 that consists of a touch sensitive area 206, which is preferably arranged such that the user is able to find it easy without looking at the device 200.

Figure 3:
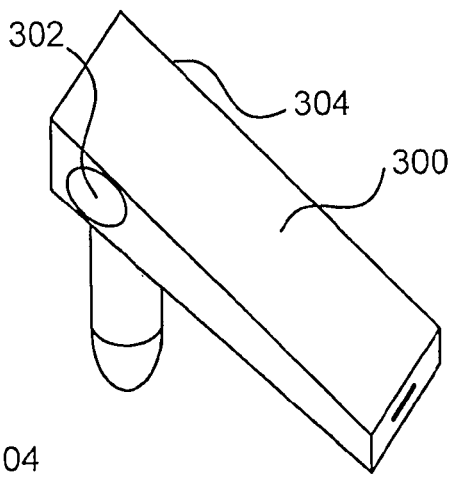
FIG. 3 illustrates a portable device according to an embodiment of the present invention.

FIG. 3 illustrates a portable device 300 according to an embodiment of the present invention. The portable device 300 has a user input for control of the device 300 that consists of a touch sensitive area 302, which is preferably arranged such that the user is able to find it easy without looking at the device 300. In this embodiment, the touch sensitive area 302 is placed opposite to the edge 304 to enable a user to squeeze over the device, thereby enabling a more precise application of force, which can be beneficial, especially when several levels of force are discriminated for several alternatives, respectively.

Figure 4:
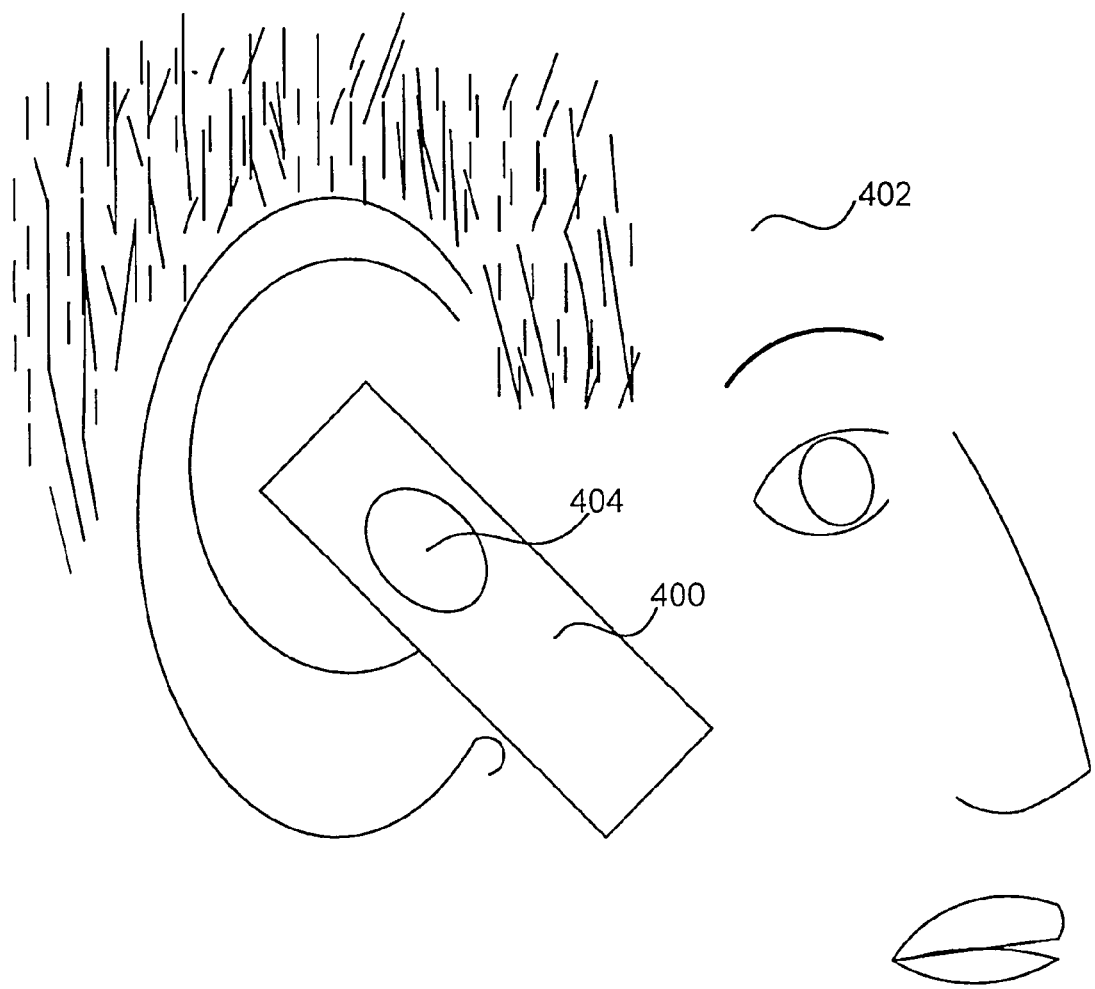
FIG. 4 illustrates use of a portable device according to the present invention.

FIG. 4 illustrates use of an example of a portable device 400 according to the present invention, when used by a user 402. As will be understood form FIG. 4, the user will not be able to look at the device 400 when actuating user input 404 during use. Similar applies to for example a pulse meter during exercise, or other similar portable device. Therefore, intuitive and easy to find user input is required.

Figure 5:
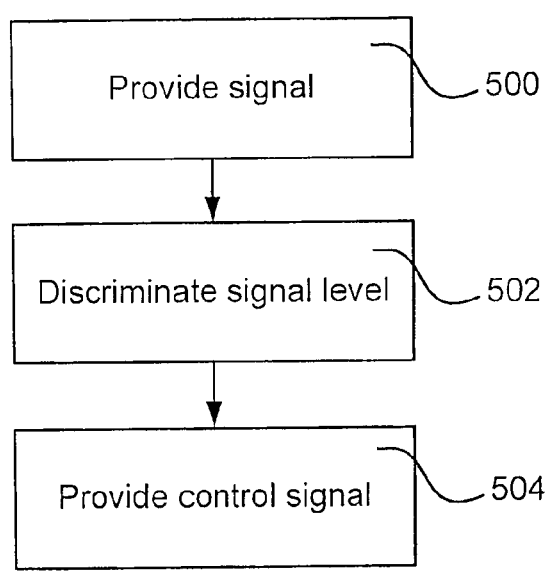
FIG. 5 is a flow chart illustrating a method according to the present invention.

FIG. 5 is a flow chart illustrating a method according to the present invention, for operating a portable device as demonstrated above with reference to any of FIGS. 1 to 4. In a signal provision step 500, a signal responsive to force applied to the touch sensitive area is provided. In a signal level discriminating step 502, one of at least two levels of said signal is discriminated from other levels. The levels are preferably distinguished by thresholds, where the lowest level preferably also is distinguished from non-actuation of the touch sensitive area by a minimum level threshold. In a control signal provision step 504, a control signal is provided corresponding to the determined level discriminated from other levels in the signal level discriminating step 502. The control signal can then be used for operating the portable device.

Figure 6:
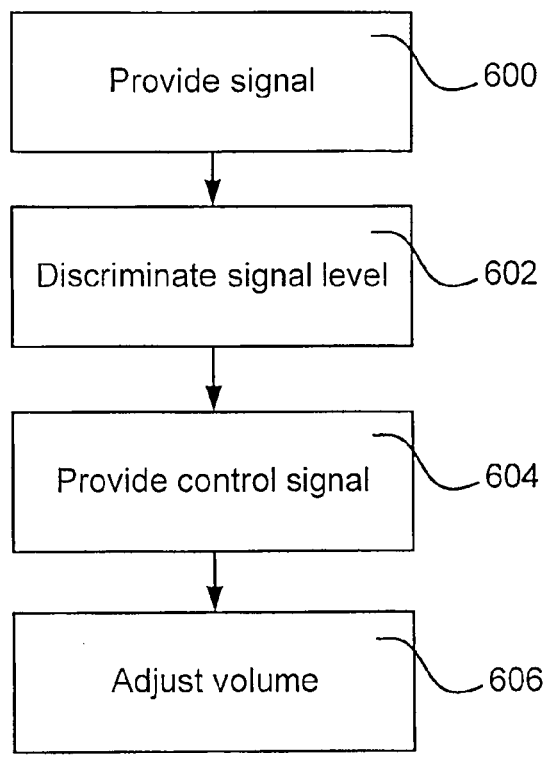
FIG. 6 is a flow chart illustrating a method according to an embodiment of the present invention.

FIG. 6 is a flow chart illustrating a method according to an embodiment of the present invention. In a signal provision step 600, a signal responsive to force applied to the touch sensitive area is provided. In a signal level discriminating step 602, one of at least two levels of said signal is discriminated from other levels. In a control signal provision step 604, a control signal is provided corresponding to the determined level discriminated from other levels in the signal level discriminating step 602. The control signal can then be used for operating the portable device by adjusting an audio volume in an audio volume adjusting step 606.

Figure 7:
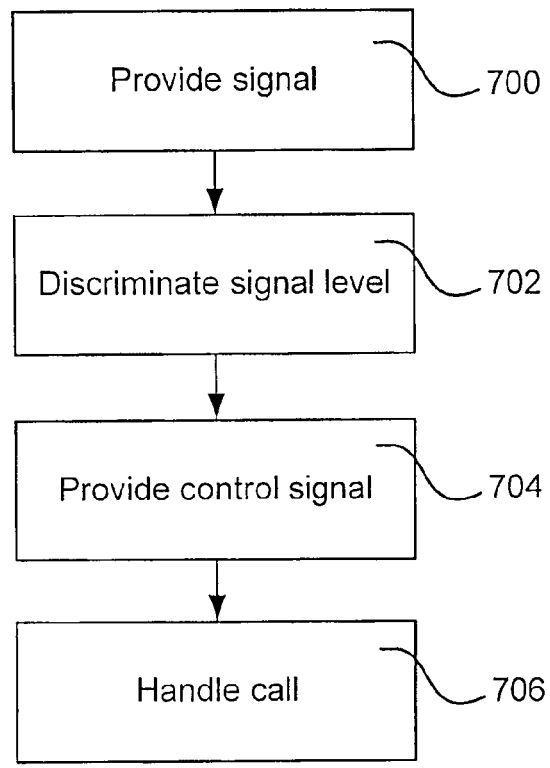
FIG. 7 is a flow chart illustrating a method according to an embodiment of the present invention.

FIG. 7 is a flow chart illustrating a method according to an embodiment of the present invention. In a signal provision step 700, a signal responsive to force applied to the touch sensitive area is provided. In a signal level discriminating step 702, one of at least two levels of said signal is discriminated from other levels. In a control signal provision step 704, a control signal is provided corresponding to the determined level discriminated from other levels in the signal level discriminating step 702. The control signal can then be used for operating the portable device by handling a call in a call handling step 706.

Figure 8:
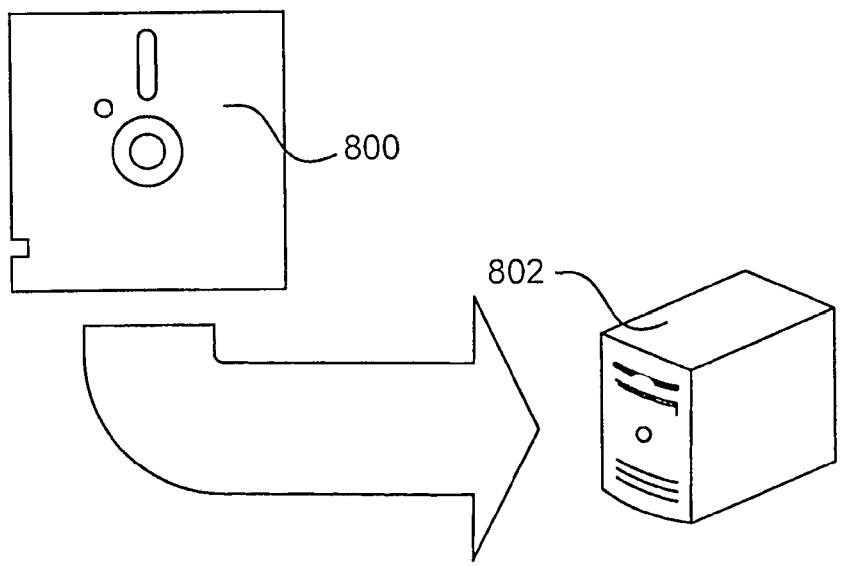
FIG. 8 illustrates a computer readable medium according to an embodiment of the present invention.

FIG. 8 is a schematic illustration of a computer readable medium according to an embodiment of the present invention. The portable device is implementable with hardware in an apparatus with aid of software. Thus, the control of operation is suitable for implementation with aid of processing means, such as general and/or signal processors. The computer program preferably comprises program code, as illustrated in FIG. 8, which is stored on a computer readable medium 800, which can be loaded and executed by a processing means 802 to cause it to perform the above described methods.

The program code can further cause the processing means to perform any of the operations described in the examples with reference to FIG. 1.

The processing means 802 and computer program product 800 can be arranged to execute the program code sequentially where actions are performed stepwise, but mostly be arranged to execute the program code on a real-time basis where actions are performed upon need and availability of data. The processing means 802 is preferably what normally is referred to as an embedded system. Thus, the depicted computer readable medium 800 and processing means 802 in FIG. 8 should be construed to be for illustrative purposes only to provide understanding of the principle, and not to be construed as any direct illustration of the elements.

The invention claimed is:

1. A portable device having a user input comprising a touch sensitive area, wherein
the user input is arranged to output a signal responsive to amount of force applied to the touch sensitive area,
the device further having a controller arranged to discriminate one of a plurality of levels of said signal for provision of a corresponding control signal to thereby cause the device to perform an action which is selected, in dependence on a magnitude of the force applied to the touch sensitive area and independently of a rate of change of the magnitude of the force applied to the touch sensitive area, from a plurality of actions, and
the touch sensitive area consists of a single touch sensitive area,
wherein the controller increases an audio volume when the magnitude of the force a lied to the touch sensitive area is eater than a threshold level, and the controller decreases an audio volume when the magnitude of the force applied to the touch sensitive area is less than said threshold level and greater than a minimum threshold level, when said user input is actuated.

2. The portable device according to claim 1, being a headset.

3. The portable device according to claim 2, wherein the headset is arranged to communicate wirelessly via Bluetooth technology.

4. The portable device according to claim 1, wherein the user input comprises a load cell, in mechanical connection with the touch sensitive area, forming a transducer for converting applied force of the user input into said signal.

5. The portable device according to claim 4, wherein the load cell is one of a group comprising a electroactive polymer, a microelectromechanical sensor, a strain gauge, and a piezoelectric sensor.

6. A method of operating a portable device having a user input comprising a touch sensitive area, wherein the touch sensitive area consists of a single touch sensitive area, the method comprising;
providing a signal responsive to amount of force applied to the touch sensitive area;
discriminating one of a plurality of levels of said signal;
providing a control signal corresponding to the discriminated level to thereby cause the device to perform an action which is selected, in dependence on a magnitude of the force applied to the touch sensitive area and independently of a rate of change of the magnitude of the force applied to the touch sensitive area, from a plurality of actions,
controlling an audio volume in response to the control signal increasing said audio volume when the magnitude of the force applied to the touch sensitive area is greater than a threshold level; and decreasing said audio volume when the magnitude of the force applied to the touch sensitive area is less than said threshold level and greater than a minimum threshold level, when said user input is actuated.

7. The method according to claim 6, wherein the portable device being a headset, further comprising communicating wirelessly via Bluetooth technology.

8. The method according to claim 6, wherein the touch sensitive area comprises a load cell forming a transducer, further comprising converting applied force of user input into said signal by said load cell.

9. A portable device having a user input comprising a touch sensitive area, wherein the user input is arranged to output a signal responsive to amount of force applied to the touch sensitive area, the device further having a controller arranged to discriminate one of a plurality of levels of said signal for provision of a corresponding control signal to thereby cause the device to perform an action which is selected, in dependence on a magnitude of the force applied to the touch sensitive area and independently of a rate of change of the magnitude of the force applied to the touch sensitive area, from a plurality of actions, and the touch sensitive area consists of a single touch sensitive area, wherein the portable device is a headset arranged to communicate wirelessly via Bluetooth technology, wherein the control signal is arranged to control handling of a call, and wherein the control signal is arranged such that said call is rejected when the magnitude of the force applied to the touch sensitive area is greater than a threshold level, and the control signal is arranged such that said call is accepted when the magnitude of the force applied to the touch sensitive area is less than the threshold level and greater than a minimum threshold level, when said call is received and said user input is actuated.

10. The portable device according to claim 9, wherein the user input comprises a load cell, in mechanical connection with the touch sensitive area, forming a transducer for converting applied force of the user input into said signal.

11. The portable device according to claim 10, wherein the load cell is one of a group comprising a electroactive polymer, a microelectromechanical sensor, a strain gauge, and a piezoelectric sensor.

12. A portable device having a user input comprising a touch sensitive area, wherein the user input is arranged to output a signal responsive to amount of force applied to the touch sensitive area, the device further having a controller arranged to discriminate one of a plurality of levels of said signal for provision of a corresponding control signal to thereby cause the device to perform an action which is selected, in dependence on a magnitude of the force applied to the touch sensitive area and independently of a rate of change of the magnitude of the force applied to the touch sensitive area, from a plurality of actions, and the touch sensitive area consists of a single touch sensitive area, wherein the portable device is a headset arranged to communicate wirelessly via Bluetooth technology, wherein the control signal is arranged to control handling of a call, and wherein the control signal is arranged such that voice control is activated for initiating said call when the magnitude of the force applied to the touch sensitive area is less than a threshold level and greater than a minimum threshold level, and the control signal is arranged such that redialing of most recent telephone number is performed for initiating said call when the magnitude of the force applied to the touch sensitive area is greater than said threshold level, when said headset is in a stand-by mode and said user input is actuated.

13. The portable device according to claim 12, wherein the user input comprises a load cell, in mechanical connection with the touch sensitive area, forming a transducer for converting applied force of the user input into said signal.

14. The portable device according to claim 13, wherein the load cell is one of a group comprising a electroactive polymer, a microelectromechanical sensor, a strain gauge, and a piezoelectric sensor.

15. A method of operating a portable device having a user input comprising a touch sensitive area, wherein the touch sensitive area consists of a single touch sensitive area, the method comprising;

providing a signal responsive to amount of force applied to the touch sensitive area;

discriminating one of a plurality of levels of said signal;

providing a control signal corresponding to the discriminated level to thereby cause the device to perform an action which is selected, in dependence on a magnitude of the force applied to the touch sensitive area and independently of a rate of change of the magnitude of the force applied to the touch sensitive area, from a plurality of actions handling a call based on the control signal rejecting said call when the magnitude of the force applied to the touch sensitive area is greater than a threshold level, and accepting said call when the magnitude of the force applied to the touch sensitive area is less than said threshold level, when said call is received and said user input is actuated, wherein the portable device being a headset, further comprising communicating wirelessly via Bluetooth technology.

16. The method according to claim 15, wherein the touch sensitive area comprises a load cell forming a transducer, further comprising converting applied force of user input into said signal by said load cell.

17. A method of operating a portable device having a user input comprising a touch sensitive area, wherein the touch sensitive area consists of a single touch sensitive area, the method comprising;

providing a signal responsive to amount of force applied to the touch sensitive area;

discriminating one of a plurality of levels of said signal;

providing a control signal corresponding to the discriminated level to thereby cause the device to perform an action which is selected, in dependence on a magnitude of the force applied to the touch sensitive area and independently of a rate of change of the magnitude of the force applied to the touch sensitive area, from a plurality of actions handling a call based on the control signal; and activating voice control for initiating said call when the magnitude of the force applied to the touch sensitive area is less than a threshold level and greater than a minimum threshold level, and performing redialing of most recent telephone number for initiating said call when the magnitude of the force applied to the touch sensitive area is greater than said threshold level, when said headset is in a stand-by mode and said user input is actuated wherein the portable device being a headset, further comprising communicating wirelessly via Bluetooth technology.

18. The method according to claim 17, wherein the touch sensitive area comprises a load cell forming a transducer, further comprising converting applied force of user input into said signal by said load cell.

* * * * *

UNITED STATES PATENT AND TRADEMARK OFFICE
CERTIFICATE OF CORRECTION

| | | |
|---|---|---|
| PATENT NO. | : 8,885,851 B2 | |
| APPLICATION NO. | : 12/026003 | |
| DATED | : November 11, 2014 | |
| INVENTOR(S) | : Marcel Westenbroek | |

It is certified that error appears in the above-identified patent and that said Letters Patent is hereby corrected as shown below:

In The Claims

Column 6, Claim 1, line 33-34:

"wherein the controller increases an audio volume when the magnitude of the force a lied to the touch sensitive area is eater than a threshold level, and the controller decreases an audio volume when the magnitude of the force applied to the touch sensitive area is less than said threshold level and greater than a minimum threshold level, when said use input is actuated." should read:

-- wherein the controller increases an audio volume when the magnitude of the force applied to the touch sensitive area is greater than a threshold level, and the controller decreases an audio volume when the magnitude of the force applied to the touch sensitive area is less than said threshold level and greater than a minimum threshold level, when said user input is actuated. --

Signed and Sealed this
Tenth Day of March, 2015

Michelle K. Lee
*Deputy Director of the United States Patent and Trademark Office*